C. H. TAYLOR & B. B. NEUTEBOOM.
RADIATOR.
APPLICATION FILED NOV. 25, 1912.
1,176,934.
Patented Mar. 28, 1916.
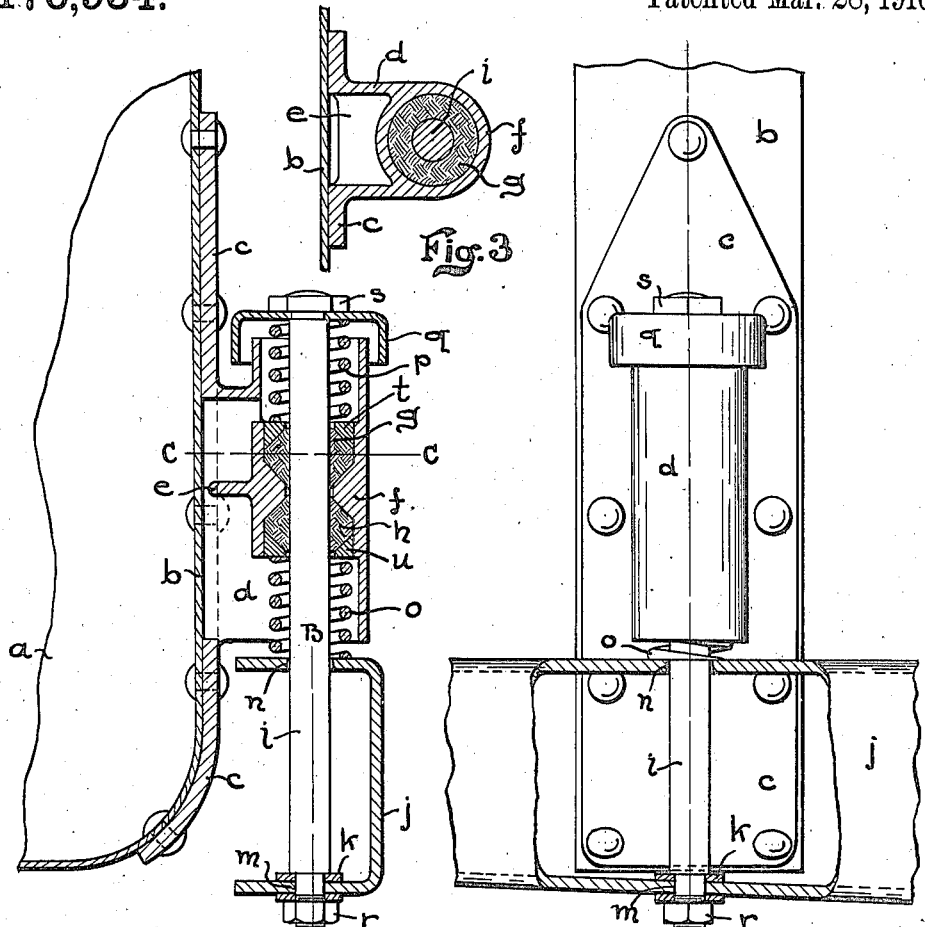
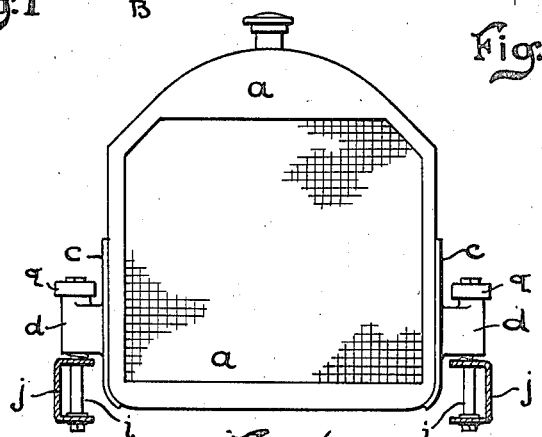
WITNESSES:
Robert N. van Baird
Virginia C. Spratt.
INVENTORS
Boudewijn B. Neuteboom
Cecil Hamlin Taylor
BY
Ralzemond A. Parker
ATTORNEY

UNITED STATES PATENT OFFICE.

CECIL HAMELIN TAYLOR AND BOUDEWIJN B. NEUTEBOOM, OF DETROIT, MICHIGAN.

RADIATOR.

1,176,934.  Specification of Letters Patent.  Patented Mar. 28, 1916.

Application filed November 25, 1912. Serial No. 733,293.

*To all whom it may concern:*

Be it known that we, CECIL HAMELIN TAYLOR, a citizen of the United States, and BOUDEWIJN B. NEUTEBOOM, a subject of the Queen of the Netherlands, residing at Detroit, county of Wayne, State of Michigan, have invented a certain new and useful Improvement in Radiators, and declare the following to be a full, clear, and exact description of the same, such as will enable others skilled in the art to which it pertains to make and use the same, reference being had to the accompanying drawings, which form a part of this specification.

Our invention relates to radiators and an object of our improvements is to provide an improved suspension for radiators upon automobiles.

An automobile is subjected to considerable strains and its frame and structure is more or less flexible so that it yields more or less to the strains incident to its use. The temporary deformation of the frame has brought strains upon the radiator which has frequently caused it to leak. A remedy has been sought for this by connecting the radiator with the frame by a spring support. But this has an incidental disadvantage that the radiator is continually vibrating, even under slight strains, or jars, which has caused breakage and leaks and is a recognized disadvantage.

To remedy the above specified defects, we have provided a suspension which shall hold the radiator in a fixed relative position upon the frame of the vehicle when subjected to moderate and ordinary forces, but which shall yield to large or unusual forces, and in which the radiator, when displaced from its normal position, shall be automatically restored thereto. We secure this object in the device illustrated in the accompanying drawings, in which, Figure 1, is a sectional view of an apparatus embodying our invention secured in position upon an automobile frame and to the radiator. Fig. 2, is an elevation of the same, looking from the right of Fig. 1, the side member of the frame being cut away on the line B—B Fig. 1. Fig. 3, is a section on the line C—C Fig. 1. Fig. 4, is a front elevation of a complete radiator showing the same secured in place upon an automobile frame.

$a$ indicates a part of the radiator of which $b$ is the frame.

$c$ is a supporting plate riveted upon the side of the frame $b$.

$d$ is a lug projecting laterally from the center of the supporting plate $c$. This lug consists of an outer wall bent in a semi-circle at its outer end and of the two sides joined by said semi-circular part. The two sides of the lug $d$ are joined by a web $e$.

$f$ is a cylindrical part of the lug $d$ located at the center thereof with its axis parallel to the side of the radiator.

$i$ is a bolt extending axially through the cylindrical portion $f$ and through the lug $d$. The bolt $i$ is provided at its upper end with a cap $q$ which covers the otherwise open top of the lug $d$. The cap $q$ is secured in place by the nut $s$ upon the bolt $i$. Said bolt extends through an aperture $n$ in the upper web of the side pieces $j$ of the vehicle frame and rests by means of a shoulder near its lower end upon a washer $k$ conformed to the upper surface of the lower web of said side piece. The lower end of the bolt $i$ passes through an aperture $m$ in the lower web of the side piece $j$ of the frame and is secured in place by a nut $r$.

The cylindrical portion $f$ of the lug $d$ is provided with inwardly extending conical surfaces toward its center and upon these surfaces rest textile or other flexible washers $g$, $h$ and upon these washers and fitted within the bore of the cylindrical portion $f$ are rings $t$ and $u$ shaped on their inner surface into conical surfaces opposed to the surfaces on the cylindrical portion $f$. Thus the central inner portion of the cylindrical portion $f$ is formed to the shape of the bottom of the interior of the casing of a stuffing box and the rings $t$ and $u$ form glands.

$o$ is a helical spring, its lower end resting upon the upper surface of the upper flange of the side piece $j$ and its upper end resting against the ring or gland $u$. $p$ is a similar helical spring, its lower end resting upon the ring or gland $t$, and its upper end against the cap $q$.

The radiator $a$ is supported by the spring $o$ and held in place by said spring and the spring $p$, said springs acting to tighten the washers $g$ and $h$ against the bolt $i$ so as to secure a certain amount of friction on said bolt to hold the radiator in place. Thus the frictional action will be proportional to the weight supported and as the spring is strained a greater force and therefore a greater frictional action will be effected thus still further reducing the oscillation of the supported part.

The friction upon the bolt $i$ will be sufficient to prevent the radiator $a$ from vibrating or from moving from its proper position unless subjected to an unusual force when the support will yield permitting a deformation of the frame of the vehicle without straining the radiator. When the abnormal force is removed, the springs $o$ and $p$ will gradually restore the radiator to its proper position.

While we have shown and described our invention as a support for radiators, we do not wish to confine it to this use, but claim a scope which shall include the use of the apparatus to support any similar fragile part.

What we claim is:—

1. In a vehicle, a radiator, a stuffing box on said radiator consisting in part of a tightening gland in said stuffing box, and a spring supporting said radiator through said gland.

2. In a vehicle, a radiator, a frictional clamp on said radiator, said clamp being adapted to be tightened by a vertical pressure, and a resilient member supporting said radiator through said clamp so as to tighten said clamp in proportion to the force exerted thereon by said resilient member.

3. In a vehicle, a radiator, a friction clamp on said radiator, said clamp being adapted to be tightened by a vertical pressure, and a resilient member supporting said radiator through said clamp so as to tighten said clamp in proportion to the force exerted thereon by said resilient member.

In testimony whereof, we sign this specification in the presence of two witnesses.

CECIL HAMELIN TAYLOR.
BOUDEWIJN B. NEUTEBOOM.

Witnesses:
 AGNES M. HIPKINS,
 ELLIOTT J. STODDARD.